United States Patent
Rojo et al.

(10) Patent No.: US 7,131,315 B2
(45) Date of Patent: Nov. 7, 2006

(54) METHODS AND APPARATUS FOR REDUCING VIBRATION RECTIFICATION ERRORS IN CLOSED-LOOP ACCELEROMETERS

(75) Inventors: Donny F. Rojo, Redmond, WA (US); Eric C. Abbott, Fall City, WA (US); Michael J. Robinson, Mukilteo, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/908,090

(22) Filed: Apr. 27, 2005

(65) Prior Publication Data

US 2006/0065039 A1    Mar. 30, 2006

Related U.S. Application Data

(60) Provisional application No. 60/613,864, filed on Sep. 28, 2004.

(51) Int. Cl.
*G01P 21/00* (2006.01)
(52) U.S. Cl. ....................................................... 73/1.38
(58) Field of Classification Search .................. 73/1.38, 73/514.29, 514.35, 514.18
See application file for complete search history.

(56) References Cited

U.S. PATENT DOCUMENTS

| | | | |
|---|---|---|---|
| 4,891,982 A * | 1/1990 | Norling | 73/497 |
| 5,205,171 A | 4/1993 | O'Brien et al. | |
| 5,375,469 A | 12/1994 | Levy et al. | |
| 5,915,278 A * | 6/1999 | Mallick | 73/658 |
| 6,631,643 B1 * | 10/2003 | Malvern et al. | 73/514.32 |
| 6,826,960 B1 * | 12/2004 | Schaad et al. | 73/14.29 |

* cited by examiner

*Primary Examiner*—Robert Raevis
(74) *Attorney, Agent, or Firm*—Black Lowe & Graham PLLC

(57) ABSTRACT

Systems and methods for minimizing vibration rectification error (VRE) for a closed-loop accelerometer. In one embodiment, the method includes applying a known vibration signal to the closed-loop accelerometer along a first axis and adjusting a feedback gain setting until VRE is below a first threshold value. After the feedback gain setting has been adjusted, applying a random vibration signal to the closed-loop accelerometer along the first axis and adjusting a servo system proportional gain value until VRE is below a second threshold value.

9 Claims, 5 Drawing Sheets

_METHODS AND APPARATUS FOR REDUCING VIBRATION RECTIFICATION ERRORS IN CLOSED-LOOP ACCELEROMETERS_

CROSS-REFERENCE TO RELATED APPLICATIONS

This invention claims the benefit of U.S. Provisional Application Ser. No. 60/613,864 filed Sep. 28, 2004, the contents of which are incorporated by reference.

BACKGROUND OF THE INVENTION

Vibration Rectification Error (VRE) is common in accelerometers. If the VRE is not compensated for, performance of the accelerometer is degraded.

Therefore, there exists a need for methods and apparatus for minimizing VRE for closed-loop accelerometers.

BRIEF SUMMARY OF THE INVENTION

The present invention provides systems and methods for minimizing vibration rectification error (VRE) for a closed-loop accelerometer. In one embodiment, the method includes applying a known vibration signal to the closed-loop accelerometer along a first axis and adjusting a feedback gain setting until VRE is below a first threshold value. After the feedback gain setting has been adjusted, applying a random vibration signal to the closed-loop accelerometer along the first axis and adjusting a servo system proportional gain value until VRE is below a second threshold value.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
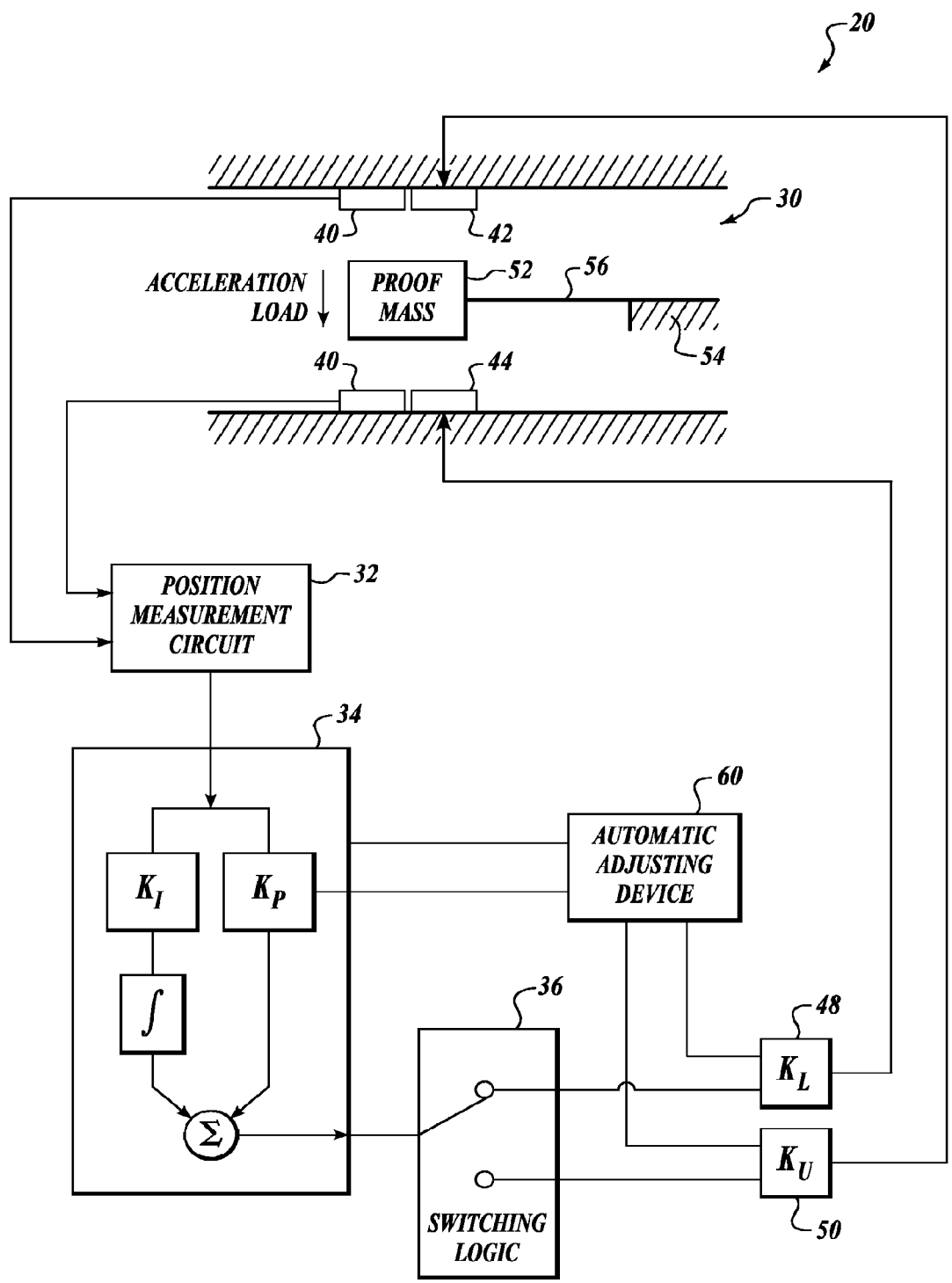
FIG. 1 illustrates an example of a closed-loop accelerometer.

FIG. 1 illustrates a closed-loop accelerometer system 20. The system 20 includes an accelerometer 30, a position measurement circuit 32, a controller 34, switching logic 36, a $K_L$ multiplier 48, and a $K_U$ multiplier 50. The accelerometer 30 includes position detectors 40 that are in signal communication with the position measurement circuit 32. The accelerometer 30 also includes upper and lower restoring force actuators 42 and 44 that are coupled to the multipliers 50 and 48, respectively. The accelerometer 30 also includes a proof mass 52 attached to stationary substrate 54 via a flexible beam 56.

During operation of the system 20, an acceleration load is applied to the accelerometer 30, whereby the proof mass 52 flexes in the direction of the experienced acceleration load. The position measurement circuit 32 determines the position of the proof mass 52 based on signal sent from the detectors 40. The controller 34 generates a restoring force signal based on the determined position of the proof mass 52.

The switching logic 36 sends the restoring force signal to one of the multipliers 48 or 50 depending upon the signal outputted by the controller 34. Then actuator 42 or 44 applies a restoring force to the proof mass 52 in order to center the proof mass 52 within the accelerometer 30. The system 20 reports the acceleration load applied to the proof mass 52 based on either one of the voltage or current level of the restoring force signal.

The present invention includes methods and systems for adjusting the value of $K_L$ or $K_U$, then adjusting the value of $K_P$ used in the controller 34 for minimizing the effects of vibration rectification error (VRE). $K_P$ is the proportional gain value and $K_I$ is the servo system integral gain value. The output of the controller 34 is shown by Equation (1):

$$K_I \int x\,dt + K_P x \qquad (1)$$

x—amount of proof mass displacement

The controller 34 converts the sensed distance value into the restoring force signal.

In one embodiment, an automatic gain value adjusting device 60 is in data communication with the controller 34 and multipliers 48 and 50. The device 60 includes a processor and memory for executing program code that analyzes the output of the controller 34 and automatically adjusts the gain values in order to minimize VRE. The device 60 performs the process shown in FIGS. 2–4. In another embodiment, adjusting the gain values is performed manually by an operator upon analysis of determined VRE (see the detailed example below).

Figure 2:
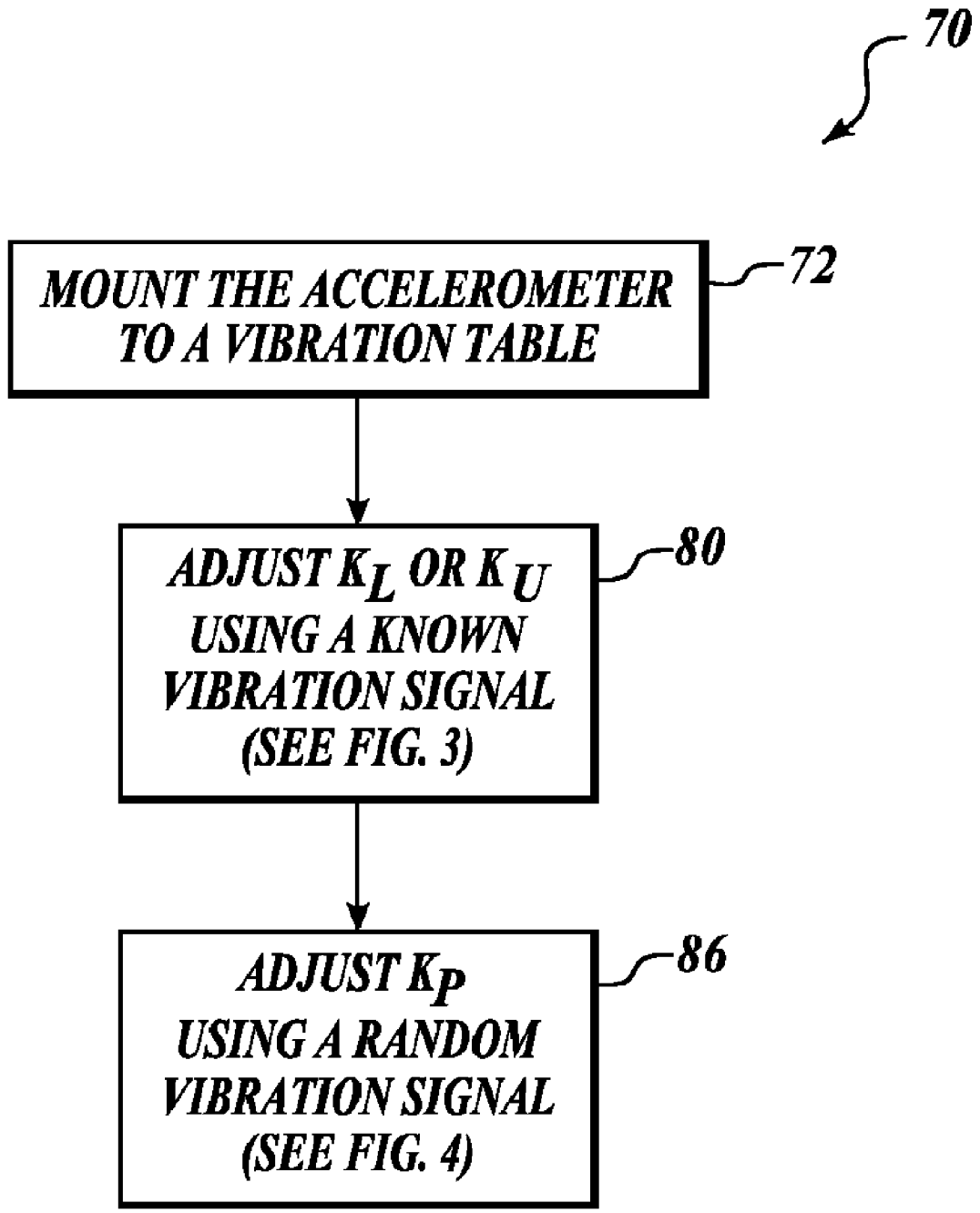
FIGS. 2–4 illustrate flow diagrams that show an example process for minimizing vibration rectification error of the closed-loop accelerometer shown in FIG. 1.

FIG. 2 illustrates an example process 70 for minimizing the effects of VRE such as that experienced by the accelerometer 30 as shown in FIG. 1. The process 70 first begins at a block 72 whereby the accelerometer 30 is mounted to a vibration table. Next at a block 80, $K_L$ or $K_U$ is adjusted using a known vibration signal. This is described in more detail below in FIG. 3.

Next at a block 86, $K_P$ is adjusted using a random vibration signal. This is described in more detail below in FIG. 4.

Figure 3:
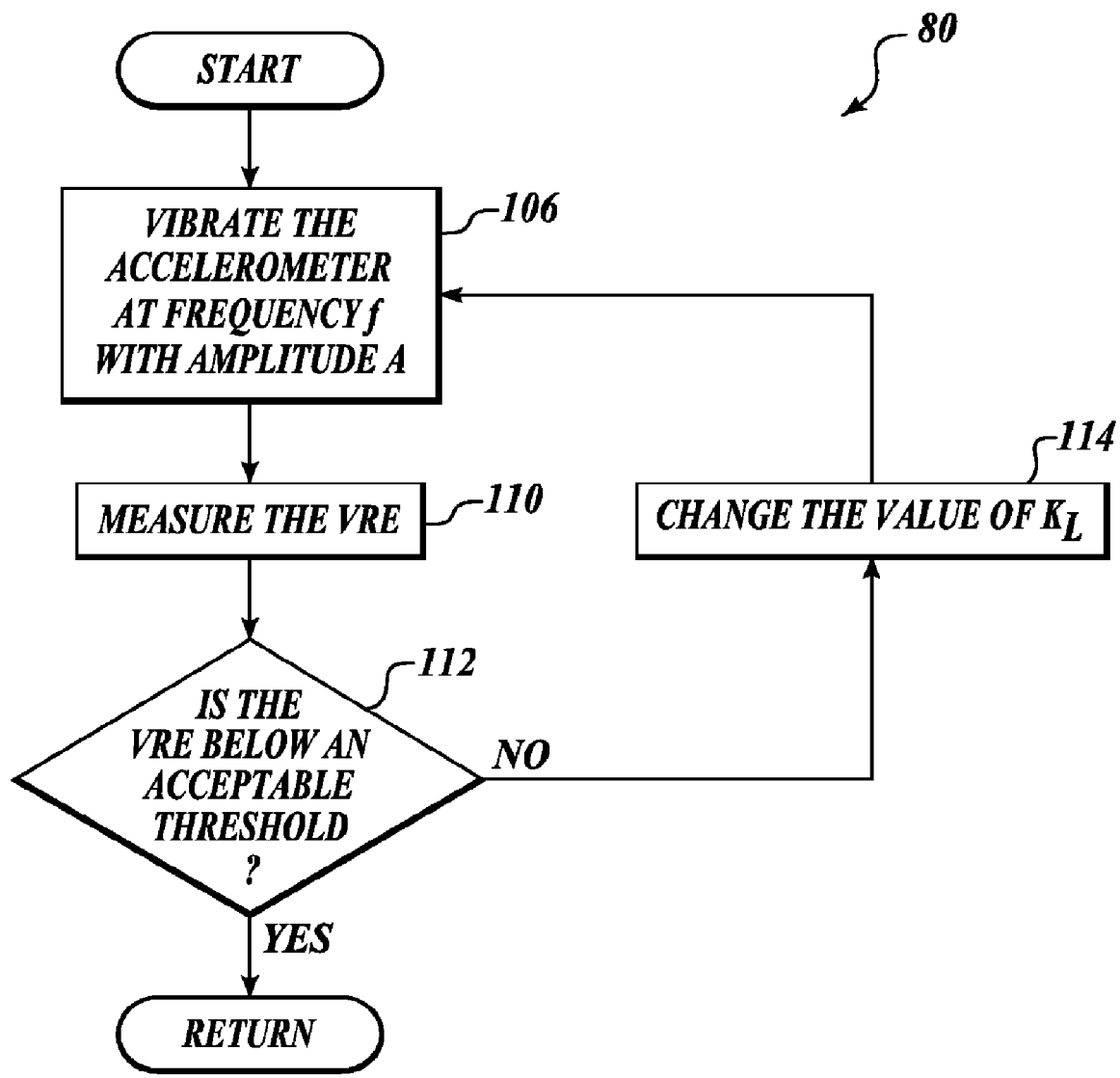

FIG. 3 illustrates an example process for performing the adjustment of $K_L$ or $K_U$ as described in the block 80 of the process 70 shown in FIG. 2. First, at a block 106, the accelerometer 30 is vibrated at a known sinusoidal frequency of frequency f having an amplitude A. Next at a block 110, VRE is measured. Then, at a decision block 112, the process 80 determines if the measured VRE is below an acceptable threshold. If at the decision block 112, the VRE is not below an acceptable threshold, then the value of $K_L$ is changed, see block 114. The process then returns to the block 106. If at the decision block 112, the VRE was measured to be below the acceptable threshold, then this part of process 70 is complete.

Figure 4:
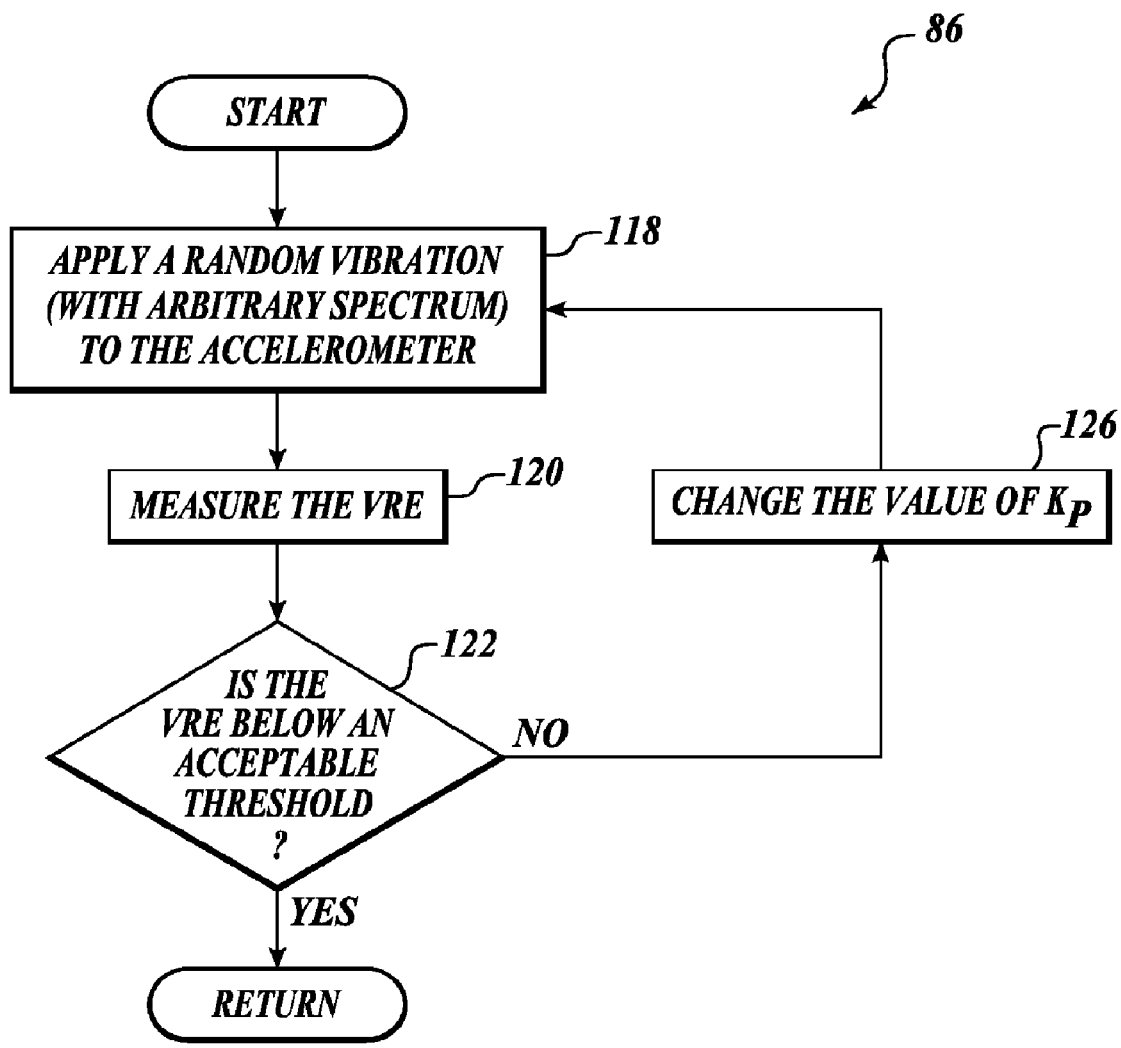

FIG. 4 illustrates the process performed at the block 86 of the process 70 shown in FIG. 2. First at a block 118, a random vibration is applied to the accelerometer 30. Then, at a block 120, the VRE of the accelerometer 30 is measured. If at a decision block 122, the VRE is not below an acceptable threshold, then at a block 126, the value of $K_P$ is changed and the process returns to the block 118. If, however, at the decision block 122, the VRE is below the acceptable threshold, this part of the process 70 is complete. In one embodiment, the thresholds described in blocks 112 and 122 are equal.

Upon completion of the process 70, VRE has been minimized because of adjusting KP after adjustments have been made to KL or KU. In systems with more than one accelerometer, the process 70 is repeated for the untested accelerometers.

Figure 5:
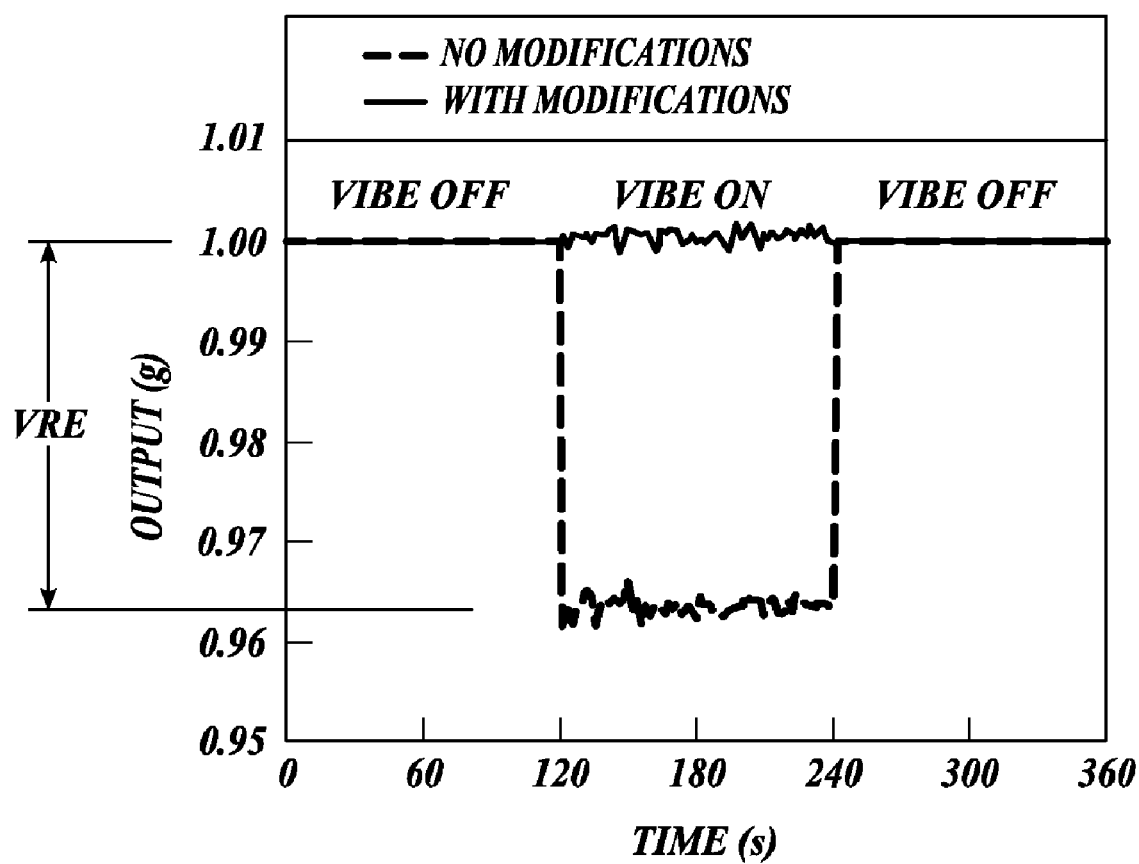
FIG. 5 illustrates response of a closed-loop accelerometer before and after adjustments to vibration rectification error according to the process shown in FIGS. 2–4.

FIG. 5 illustrates an example response of an accelerometer before and after the process 70 shown in FIG. 2 has been performed.

While the preferred embodiment of the invention has been illustrated and described, as noted above, many changes can be made without departing from the spirit and scope of the invention. For example, the accelerometer 30 are MEMS or non-MEMS devices that can be made from silicon, quartz, fused silica, or any other material that develops its rebalancing force using electrostatics, magnetic fields, piezoelectric effects, or any other means. Accordingly, the scope of the invention is not limited by the disclosure of the preferred embodiment. Instead, the invention should be determined entirely by reference to the claims that follow.

What is claimed is:

1. A method for minimizing vibration rectification error (VRE) for a closed-loop accelerometer, the method comprising:
    adjusting a feedback gain setting until VRE is below a first threshold value; and
    adjusting a servo system proportional gain value until VRE is below a second threshold value.

2. The method of claim 1, wherein the first threshold value and the second threshold value are equal.

3. The method of claim 1, wherein adjusting the feedback gain setting includes applying a known vibration signal to the closed-loop accelerometer along a first axis.

4. The method of claim 3, wherein the known vibration signal includes a known frequency and amplitude.

5. The method of claim 4, wherein adjusting the servo system proportional gain value includes applying a random vibration signal to the closed-loop accelerometer along the first axis.

6. The method of claim 5, wherein adjusting the feedback gain setting and adjusting the servo system proportional gain value are performed automatically.

7. A system for minimizing vibration rectification error (VRE) for a closed-loop accelerometer, the system comprising:
    a position measuring component for measuring the position of a proof mass of the closed-loop accelerometer;
    a controller coupled with the position measuring component for generating a actuator signal based on the measured position of the proof mass and a preset servo system proportional gain setting; and
    at least one feedback gain component for altering the generated actuator signal according to an associated preset feedback gain setting,
    wherein the feedback gain setting is adjust to minimize VRE when a known vibration signal is applied to the closed-loop accelerometer,
    wherein the servo system proportional gain setting is adjusted to minimize VRE when a random vibration signal is applied to the closed-loop accelerometer after the feedback gain setting was adjusted to minimize VRE.

8. A system for minimizing vibration rectification error (VRE) for a closed-loop accelerometer, the system comprising:
    a position measuring component for measuring the position of a proof mass of the closed-loop accelerometer;
    a controller coupled with the position measuring component for generating a actuator signal based on the measured position of the proof mass and a preset servo system proportional gain setting;
    at least one feedback gain component for altering the generated actuator signal according to an associated preset feedback gain setting; and
    a computer-based device coupled with the controller and the at least one feedback gain component, the computer-based device comprising:
        a first component for adjusting the feedback gain setting to minimize VRE when a known vibration signal is applied to the closed-loop accelerometer; and
        a second component for adjusting the servo system proportional gain setting to minimize VRE when a random vibration signal is applied to the closed-loop accelerometer after the feedback gain setting was adjusted to minimize VRE.

9. The system of claim 8, wherein the first and second components automatically perform adjusting.

* * * * *